(12) United States Patent
Jung et al.

(10) Patent No.: US 10,778,780 B2
(45) Date of Patent: Sep. 15, 2020

(54) APPARATUS AND METHOD FOR CONTROLLING CONNECTION IN COMMUNICATION SYSTEM

(71) Applicant: Samsung Electronics Co., Ltd, Suwon-si (KR)

(72) Inventors: Hakyung Jung, Suwon-si (KR); Sooyoung Jang, Suwon-si (KR); Jinhyoung Kim, Seongnam-si (KR); Jinho Lee, Seoul (KR); Hyunjoo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 16/010,096

(22) Filed: Jun. 15, 2018

(65) Prior Publication Data

US 2018/0367619 A1 Dec. 20, 2018

(30) Foreign Application Priority Data

Jun. 16, 2017 (KR) .......................... 10-2017-0076682

(51) Int. Cl.
*H04L 29/08* (2006.01)
*H04L 29/12* (2006.01)
*H04L 29/06* (2006.01)

(52) U.S. Cl.
CPC ........ *H04L 67/141* (2013.01); *H04L 61/1511* (2013.01); *H04L 61/6009* (2013.01); *H04L 63/168* (2013.01); *H04L 67/02* (2013.01); *H04L 67/2814* (2013.01); *H04L 67/2819* (2013.01)

(58) Field of Classification Search
CPC .............. H04L 67/141; H04L 61/6009; H04L 67/2819; H04L 67/02; H04L 63/168; H04L 67/2814; H04L 61/1511; H04L 67/28
USPC ......................................................... 709/227
See application file for complete search history.

(56) References Cited

U.S. PATENT DOCUMENTS

| 2002/0087722 | A1 | 7/2002 | Datta et al. |
| 2003/0055979 | A1 | 3/2003 | Cooley |
| 2003/0193912 | A1* | 10/2003 | O'Neill .................. H04L 63/08 370/331 |

(Continued)

OTHER PUBLICATIONS

European Patent Office, "Communication pursuant to Article 94(3) EPC," Application No. EP18177520.6, dated Jun. 18, 2019, 4 pages.

(Continued)

*Primary Examiner* — Tu T Nguyen

(57) ABSTRACT

The present disclosure relates to a pre-$5^{th}$-Generation (5G) or 5G communication system for supporting higher data rates Beyond $4^{th}$-Generation (4G) communication system such as Long Term Evolution (LTE). Disclosed is a method of operating a proxy device in a communication system. The method includes: receiving information on at least one domain name from an external server; generating connection information on the at least one domain name; receiving a domain name system (DNS) query message including one of the at least one domain name from a client device; and establishing a connection to a server corresponding to the domain name included in the DNS query message based on the connection information.

20 Claims, 13 Drawing Sheets

(56) References Cited

U.S. PATENT DOCUMENTS

| | | | |
|---|---|---|---|
| 2006/0059092 A1* | 3/2006 | Burshan | H04L 29/06 705/51 |
| 2008/0195696 A1 | 8/2008 | Boutroux et al. | |
| 2013/0198269 A1 | 8/2013 | Fleischman et al. | |
| 2014/0359092 A1* | 12/2014 | Middleton | G06F 9/541 709/221 |
| 2017/0207989 A1* | 7/2017 | Cai | H04L 61/1511 |
| 2017/0374017 A1* | 12/2017 | Gautam | H04L 61/1511 |

OTHER PUBLICATIONS

Netmanias, "Global Server Load Balancing for Enterprise—Part 2: Site/Server Selection Policy (1)", Oct. 8, 2012, 4 pages.
European Search Report dated Oct. 23, 2018 in connection with European Patent Application No. 18 17 7520, 7 pages.
Summons to attend oral proceedings pursuant to Rule 115(1) EPC in connection with European Application No. 18177520.6 dated Feb. 14, 2020, 6 pages.
Brief Communication dated Jun. 11, 2020 in connection with European Patent Application No. 18177520.6, 5 pages.
Decision to refuse a European Patent application dated Jul. 9, 2020 in connection with European Patent Application No. 18 177 520.6, 9 pages.

* cited by examiner

APPARATUS AND METHOD FOR CONTROLLING CONNECTION IN COMMUNICATION SYSTEM

CROSS-REFERENCE TO RELATED APPLICATION AND CLAIM OF PRIORITY

This application is based on and claims priority under 35 U.S.C. § 119 to Korean Patent Application No. 10-2017-0076682 filed on Jun. 16, 2017 in the Korean Intellectual Property Office, the disclosure of which is incorporated herein by reference in its entirety.

BACKGROUND

1. Field

The present disclosure relates generally to a communication system, and more particularly to an apparatus and a method for controlling a connection establishment in a proxy environment.

2. Description of Related Art

The above information is presented as background information only to assist with an understanding of the present disclosure. No determination has been made, and no assertion is made, as to whether any of the above might be applicable as prior art with regard to the present disclosure.

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

5G considers various types of terminals. For example, discussion on a Fixed Wireless Access (FWA) scheme in which a device having low mobility or no mobility performs wireless communication with a wireless network Base Station (BS) has been conducted. The FWA may be used for connection of an Internet service within the home such as an office and a house, and in this case, conventional installation costs and efforts of the wired network can be reduced.

SUMMARY

Based on the discussion, the present disclosure provides an apparatus and a method for controlling a connection establishment in a communication system.

The present disclosure provides an apparatus and a method for preventing a connection establishment delay in a proxy environment of a communication system.

The present disclosure provides an apparatus and a method for controlling a connection establishment by managing Domain Name System (DNS) query result information on a domain name in a proxy environment.

The present disclosure provides an apparatus and a method for preventing a connection establishment delay by managing redirect information on a domain name in a proxy environment.

In accordance with an aspect of the present disclosure, a method of operating a proxy device in a communication system is provided. The method includes: receiving information on at least one domain name from an external server; generating connection information on the at least one domain name; receiving a DNS query message including one of the at least one domain name from a client device; and establishing a connection to a server corresponding to the domain name included in the DNS query message based on the connection information.

In accordance with another aspect of the present disclosure, a proxy device in a communication system is provided. The proxy device includes: a transceiver; and at least one processor functionally connected to the transceiver and configured to control transmission/reception of a signal, wherein the at least one processor performs control to receive information on at least one domain name from an external server, generate connection information on the at least one domain name, receive a DNS query message including one of the at least one domain name from a client device, and establish a connection to a server corresponding to the domain name included in the DNS query message based on the connection information.

An apparatus and a method according to various embodiments of the present disclosure can reduce a connection establishment delay due to a DNS query response or a delay due to generation of redirect based on DNS query information on a domain name in a proxy environment. Accordingly, it is possible to reduce a webpage loading time or an initial delay in video streaming, thereby improving the Quality of Experience (QoE) of users. Further, a method according to various embodiments of the present disclosure can encourage widespread use thereof since it is not required to change devices (for example, a server, an Access Point (AP), a terminal, and an application) other than a proxy device.

Effects which can be acquired by the present disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

The present disclosure relates to an apparatus and a method for controlling data transmission in a communication system. Specifically, the present disclosure describes a technology for controlling a connection establishment or a conenction set-up in a proxy environment.

Terms referring to network entities used in the following description, terms referring to control information (for example, Round-Trip Time (RTT)), terms referring to elements of devices, and terms referring to communications technology are employed for convenience of description. Accordingly, the present disclosure is not limited to the following terms, and other terms having the same technical meaning may be used.

Further, the present disclosure includes various embodiments using a 5$^{th}$-Generation (5G) system and a Wi-Fi system, but the systems are only examples. Various embodiments of the present disclosure may be easily modified and applied to other communication systems.

Figure 1:
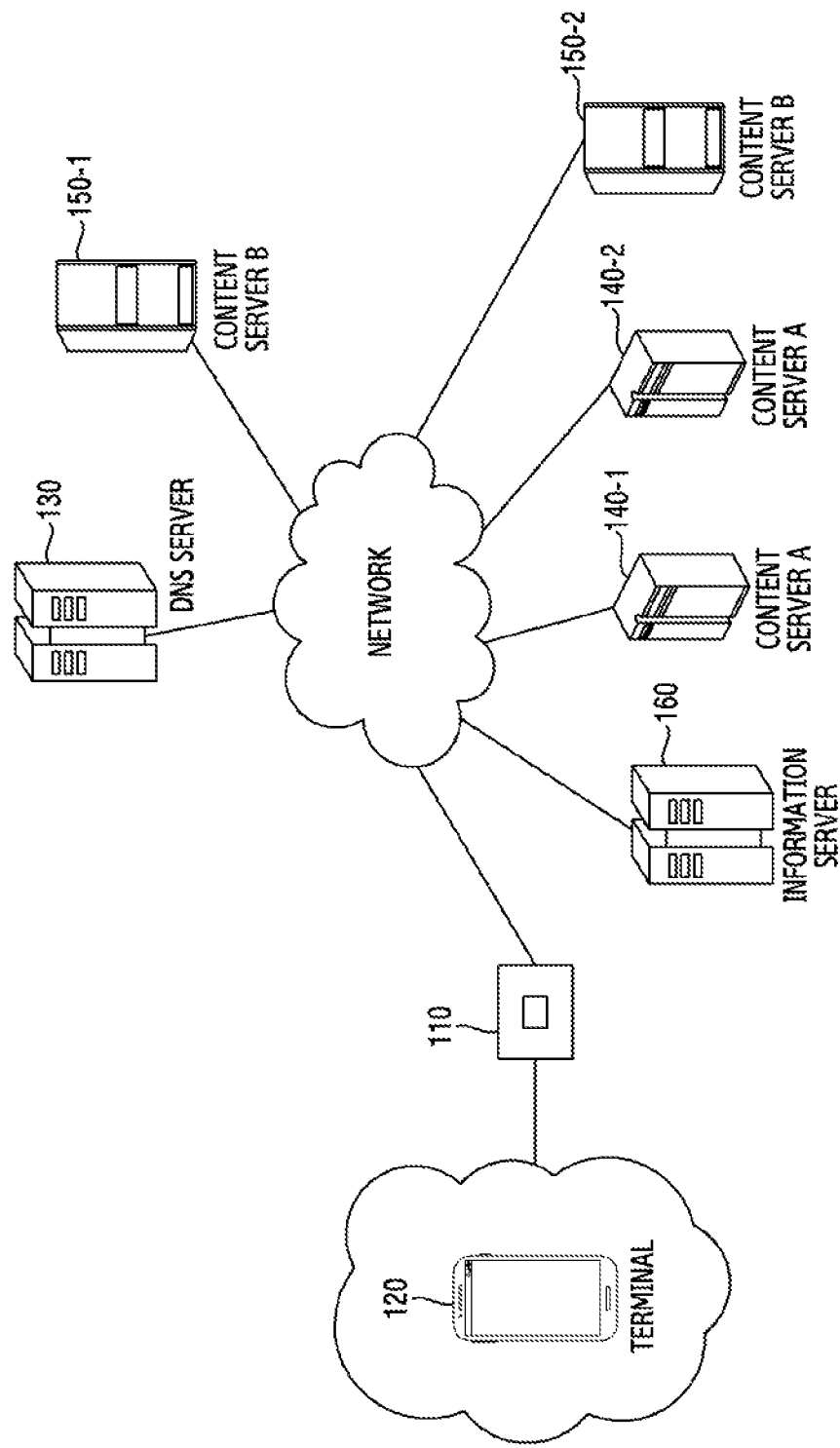
FIG. 1 illustrates a communication system according to various embodiments of the present disclosure.

FIG. 1 illustrates a communication system according to various embodiments of the present disclosure. Referring to FIG. 1, the system includes a proxy device 110, a terminal 120, a Domain Name System (DNS) server 130, content servers A 140-1 and 140-2, content servers B 150-1 and 150-2, and an information server 160.

The proxy device 110 is a relay device that receives a request from at least one client device (for example, the mobile terminal 120) and relays data transmission from a server (for example, the DNS server 130, the content servers A 140-1 and 140-2, and the content servers B 150-1 and 150-2). The proxy device 110 may serve to relay a request for resources to the server to simplify and encapsulate the structure of a distributed system and reduce service complexity. Accordingly, the proxy device 110 may relay packet transmission and reception to allow the terminal 120 to receive various application services (for example, download of Augmented Reality (AR) content, Virtual Reality (VR) content, a game, and a file) through the server (for example, the content servers A 140-1 and 140-2 and the content servers B 150-1 and 150-2). According to various embodiments, the proxy device 110 may be a stationary device connected to a wired network. Further, the proxy device 110 may be a Fixed Wireless Access (FWA) device that receives wireless access from a Base Station (BS). According to various embodiments, in an environment in which the conventional wired network is being replaced with a wireless network (for example, an LTE wireless access network or a 5G wireless access network) to provide the Internet within the home, the proxy device 110 may be a device within the home for performing wireless communication with the BS of the wireless access network. For example, the proxy device 110 may be a Customer Premise Equipment (CPE) device for providing Internet service within the home. The proxy device 110 may be a device combining the functions of two or more of the above devices. According to various embodiments, when receiving a DNS query request from at least one client device (for example, the terminal 120), the proxy device 110 may prevent a connection delay by controlling a connection establishment based on pre-generated DNS query information.

The terminal 120 is a client device that provides a service, such as a bidirectional service or a voice/video call, provided through an Internet network. For example, the terminal 120 may be one of a smart phone, a portable terminal, a mobile phone, a mobile pad, a media player, a tablet computer, a handheld computer, and a PDA (Personal Digital Assistant). Further, the terminal may be a device generated through a combination of two or more functions of the above devices. According to an embodiment, the terminal 120 may be connected to the proxy device 110 through an Access Point (AP) constituting a Wi-Fi access network and may transmit/receive data for various application services from the server (for example, the DNS server 130, the content servers A 140-1 and 140-2, and the content servers B 150-1 and 150-2) through the proxy device 110. According to another embodiment, the AP may be included as a partial function block of the proxy device 110.

The DNS server 130 is a server that converts a domain address into an IP address, which an electronic device such as a computer can recognize. For example, the DNS server 130 receives a DNS query message of the terminal 120 through the proxy device 110 and transmits DNS query result information to the proxy device 110.

The content servers A 140-1 and 140-2 and the content servers B 150-1 and 150-2 are devices for providing various application services. The content servers A 140-1 and 140-2 and the content servers B 150-1 and 150-2 may provide multimedia services such as those supporting a voice, an audio signal, a video, and data based on an IP. For example, the content servers A 140-1 and 140-2 and the content servers B 150-1 and 150-2 may provide a connection of a webpage for an Internet service. According to an embodiment, the terminal 120 may transmit a DNS query to the DNS server 130 through the proxy device 110 and receive addresses of at least one server (for example, the content servers A 140-1 and 140-2 and the content servers B 150-1 and 150-2) corresponding to domains from the DNS server 130. The terminal 120 may transmit/receive data to/from the received server address. For example, the content servers A 140-1 and 140-2 may be servers corresponding to a DNS query result for a particular website, and the content servers B 150-1 and 150-2 may be redirect servers for a particular website.

The information server 160 refers to a server that manages information on traffic for each Internet site. For example, the information server 160 may provide an amount of traffic or priority information for each Internet site within a particular time period to the proxy device 110. According to an embodiment, the information server 160 may be an Alexa server.

Figure 2:
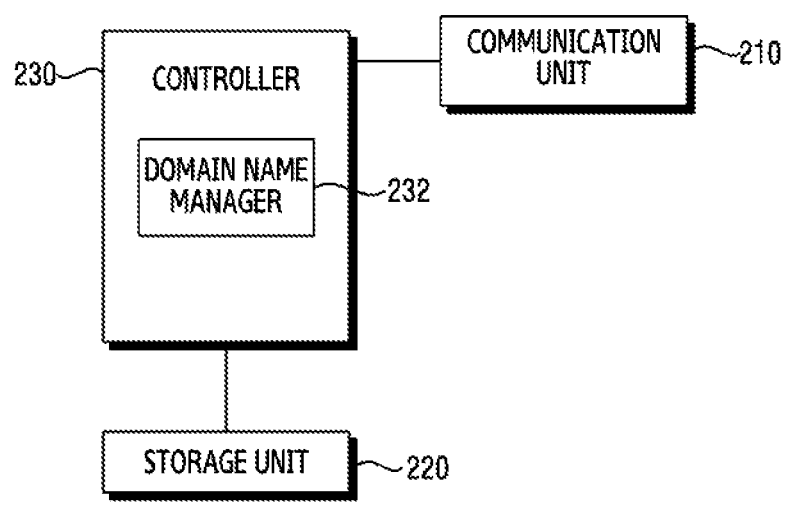
FIG. 2 is a block diagram illustrating a proxy device in the communication system according to various embodiments of the present disclosure.

FIG. 2 is a block diagram illustrating the proxy device in the communication system according to various embodiments of the present disclosure. FIG. 2 may illustrate the configuration of the proxy device 110. The suffix "-unit" or "-er" used hereinafter may refer to a unit for processing at least one function or operation, and may be implemented as hardware, software, or a combination of hardware and software. As illustrated in FIG. 2, the proxy device includes a communication unit 210, a storage unit 220, and a controller 230.

The communication unit 210 may include at least one interface for transmitting and receiving signals between different nodes within the network or transmitting and receiving signals between nodes of different networks. That is, the communication unit 210 may convert a bitstream transmitted from the proxy device to another node, for example, an access node, a BS, or a core network, into a physical signal and convert a physical signal received from another node to a bitstream. According to an embodiment, the communication unit 210 may support two or more communication interfaces. For example, the communication unit 210 may support a first interface for accessing a wireless access network for communication with an external server and a second interface for providing an Internet connection to a particular space (for example, within the home). The first interface may be implemented as a wireless interface, and the second interface may be implemented as a wired or wireless interface.

For example, the communication unit 210 is a wireless interface and may include a wireless communication unit (not shown) that performs functions for transmitting/receiving signals through a wireless channel. The wireless communication unit performs a function for conversion between a baseband signal and a bitstream according to a physical layer standard of the system. For example, in data transmission, the wireless communication unit generates complex symbols by coding and modulating a transmission bitstream. Further, in data reception, the wireless communication unit reconstructs a reception bitstream by decoding and demodulating a baseband signal. Also, the wireless communication unit up-converts a baseband signal into a radio-frequency (RF) band signal and transmits the same through an antenna, and down-converts an RF band signal received through an antenna into a baseband signal. To this end, the wireless communication unit may include a transmission filter, a reception filter, an amplifier, a mixer, an oscillator, a Digital-to-Analog convertor (DAC), an Analog-to-Digital convertor (ADC), and the like. Further, the wireless communication unit may include a plurality of transmission/reception paths. In addition, the wireless communication unit may include at least one antenna array consisting of a plurality of antenna elements. On the hardware side, the wireless communication unit may include a digital unit and an analog unit, and the analog unit may include a plurality of sub-units according to operation power, operation frequency, and the like. According to various embodiments, the proxy device may interwork with the BS of the wireless access network through the wireless communication unit.

The communication unit 210 transmits and receives the signal as described above. Accordingly, the communication unit 210 may be referred to as a "transmitter", a "receiver", or a "transceiver". Also, in the following description, the transmission and reception performed through a wireless or wired channel may mean that the above-described processing is performed by the communication unit 210.

The storage unit 220 stores a basic program, an application, and data such as setting information for the operation of the proxy device. The storage unit 220 may be configured as volatile memory, non-volatile memory, or a combination of volatile memory and non-volatile memory. Further, the storage unit 220 provides stored data in response to a request from the controller 230.

The controller 230 controls the overall operation of the proxy device. For example, the controller 230 transmits and receives signals through the communication unit 210. Further, the controller 230 records data in the storage unit 220 and reads the recorded data. To this end, the controller 230 may include at least one of a processor and a microprocessor, or may be part of the processor. Further, the part of the communication unit 210 or the controller 230 may be referred to as a Communication Processor (CP). Particularly, according to various embodiments described below, the controller 230 may manage information on a domain name in the proxy device and control a response to a DNS query and a connection establishment to the corresponding domain based on the information on the domain name. To this end, the controller 230 may include a domain name manager 232. The domain name manager 232 may correspond to an instruction set or code stored in the storage unit 220, and may be instructions/code residing at least temporarily in the controller 230, a storage space that stores the instructions/code, or part of the circuitry included in the controller 230. For example, the controller 230 controls the proxy device to perform procedures according to various embodiments described below.

As the discussion on the 5G standardization is regularized, innovation of autonomous vehicles, IoT, and wireless broadband fields to work at a speed at a gigabit level is predicted. Particularly, there is discussion on a method of increasing the Quality of Experience of the user for various services by realizing high speed while decreasing excessive costs for wired network installation in every house by providing Internet services within the home through 5G FWA based on the high speed of 5G. Further, a 5G system requires latency (delay)-intolerant services and interactive services such as VR and AR. Accordingly, in order to improve the Quality of Experience (QoE) of the user for real-time services through 5G, not only the speed but also the delay should be considered.

When a delay for connection establishment occurs in a user terminal, it deteriorates the QoE of the user, and thus a method of reducing the establishment delay is required. As a representative example of the connection establishment delay according to an embodiment, there is a loading delay of a webpage when a web-surfing application is executed. When no IP address corresponding to a domain name is found in a DNS cache during web surfing by the user terminal, the IP address for the corresponding domain name is acquired through a DNS query. Recently, the DNS tends to increase the accuracy of information by configuring a Time To Live (TTL), indicating the expiration date of the information, to be a small value. When the TTL is configured to be short for this reason, it is highly likely that there is no IP address information corresponding to the domain name in a DNS cache, and thus a connection establishment delay is caused due to frequent execution of DNS queries. Further, in accessing a webpage of a large portal site, communication with several domains is generally performed, and thus DNS queries may be frequently executed. The frequent execution of DNS queries means a long connection establishment time and a long webpage loading time. For example, a DNS query response time (a time used for a DNS request-response) through a particular communication service provider network may be around 100 ms.

Further, when redirection information on a particular domain is received, the connection establishment may be further delayed. The redirect information may be classified, for example, into the case in which Hyper Text Transfer Protocol (HTTP) access is redirected to Hyper Text Transfer Protocol over Secure Socket Layer (HTTPS) access and the case in which domain A is redirected to domain B. According to an embodiment, when aaa.com is input to the user terminal, an aaa portal supports HTTPS, and thus a message for redirection to https://www.aaa.com may be transmitted. In this case, additional time of hundreds of ms may be unnecessarily spent. According to an embodiment, in response to a request for connection to domain A, the user terminal may receive a message for redirection to domain B. In this case, since the access domain may be changed, an additional new DNS query may be used or required, and the connection establishment may be further delayed.

As described above, in order to improve QoE of the user, it is important to reduce the connection establishment time when a request for executing a service from the user is made. Accordingly, the present disclosure proposes a method of improving the QoE of the user by minimizing a DNS query response time delay and also minimizing a delay due to the occurrence of redirection in the proxy environment.

However, the present disclosure is not limited to the 5G service environment or the Wi-Fi environment. According to other embodiments, a method of controlling the connection establishment proposed by the present disclosure may be applied to all systems providing a service requiring a DNS query and including a proxy environment.

As described above, the present disclosure proposes a method of controlling connection establishment in a proxy environment. According to various embodiments of the present disclosure, operations for managing DNS query information and controlling the connection establishment in the proxy environment may be performed as illustrated in FIGS. 3 to 13.

Figure 3:
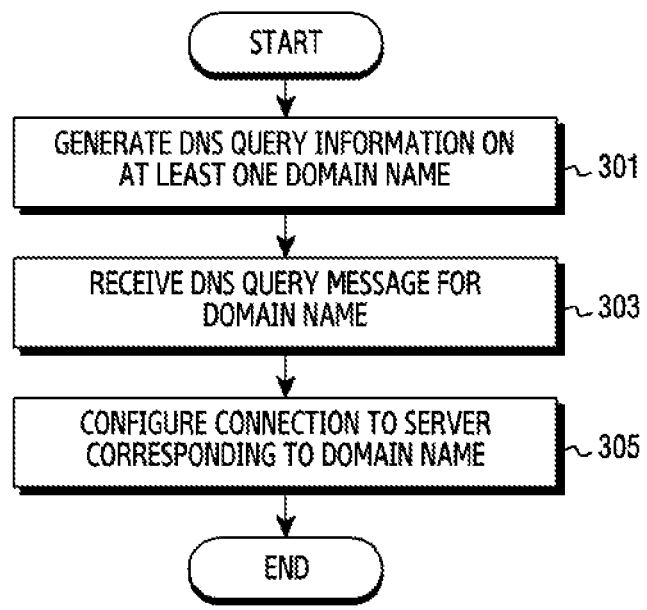
FIG. 3 illustrates a method of operating the proxy device in the communication system according to various embodiments of the present disclosure.

FIG. 3 illustrates a method of operating the proxy device in the communication system according to various embodiments of the present disclosure. FIG. 3 illustrates an operation method of the proxy device 110.

Referring to FIG. 3, in step 301, the proxy device generates DNS query information on at least one domain name. For example, the proxy device may generate or update DNS query information on at least one domain name periodically or on demand. According to an embodiment, the proxy device may generate or update a domain list including at least one domain name based on real-time traffic of client devices (for example, the terminal 120), traffic history, and top 100 traffic sites. For example, the proxy device may receive top 100 site information from an external server (for example, the information server 160). The proxy device may perform a DNS query for domain names within the domain list periodically or on demand, and may generate or update RTT information on IP addresses within the DNS query result periodically or on demand.

Thereinafter, in step 303, the proxy device receives a DNS query message for the domain name from the client device (for example, the terminal 120). The DNS query message may include at least one domain name. According to an embodiment, the proxy device may receive the DNS query message as the client device executes an application such as a web-surfing application.

In step 305, the proxy device establishes a connection to a server corresponding to the domain name. For example, the proxy device may search for DNS query information on the corresponding domain name and transmit a message that makes a request for establishing the connection to a corresponding IP address. The corresponding IP address may be the IP address having the smallest RTT value or an IP address for the redirect server. At this time, a response message of the DNS query may be transmitted to the client device. The response message may include a single IP address having the smallest RTT value or a plurality of IP addresses that are sequentially arranged in ascending order, starting with the shortest RTT. According to an embodiment, when there is no DNS query information generated for the corresponding domain name, the proxy device may perform a DNS query to the DNS (for example, the DNS server 130) and establishes the connection to the corresponding IP address. At this time, the proxy device may update DNS query information on the corresponding domain name.

According to an embodiment, a proxy device (for example, the proxy device 110 (a CPE, which is a device for providing an Internet service within the home) located near the client device (for example, the terminal 120) may manage the DNS information. The proxy device may transmit a DNS query response of a DNS query of the client device based on the DNS information so as to minimize the delay according to the DNS query and the DNS query response between the client device and the DNS (for example, the DNS server 130) (for example, a delay between the client device and the DNS: 80~130 ms and a delay between the client device and the proxy device: ~10 ms). Further, the proxy device transmits the DNS query response including only (or preferentially transmits) the IP address having the shortest delay among a plurality of IP addresses included in the DNS query response from the DNS so as to reduce both the delay generated by establishing the connection to the server and the delay to be generated by exchanging data through the connection in the future.

As described above, a new method of solving the conventional establishment delay problem due to the frequent execution of DNS queries and improving the QoE of the user is required. The present disclosure may encourage widespread use of the technology by presenting a method of controlling the connection establishment to improve the QoE of the user only through modification of the proxy device without any modification of the server/terminal/application. According to various embodiments of the present disclosure, a more detailed procedure in which the proxy device manages DNS query information and induces the connection to the IP address having the fastest response may be performed as illustrated in FIGS. 4 to 8.

Figure 4:
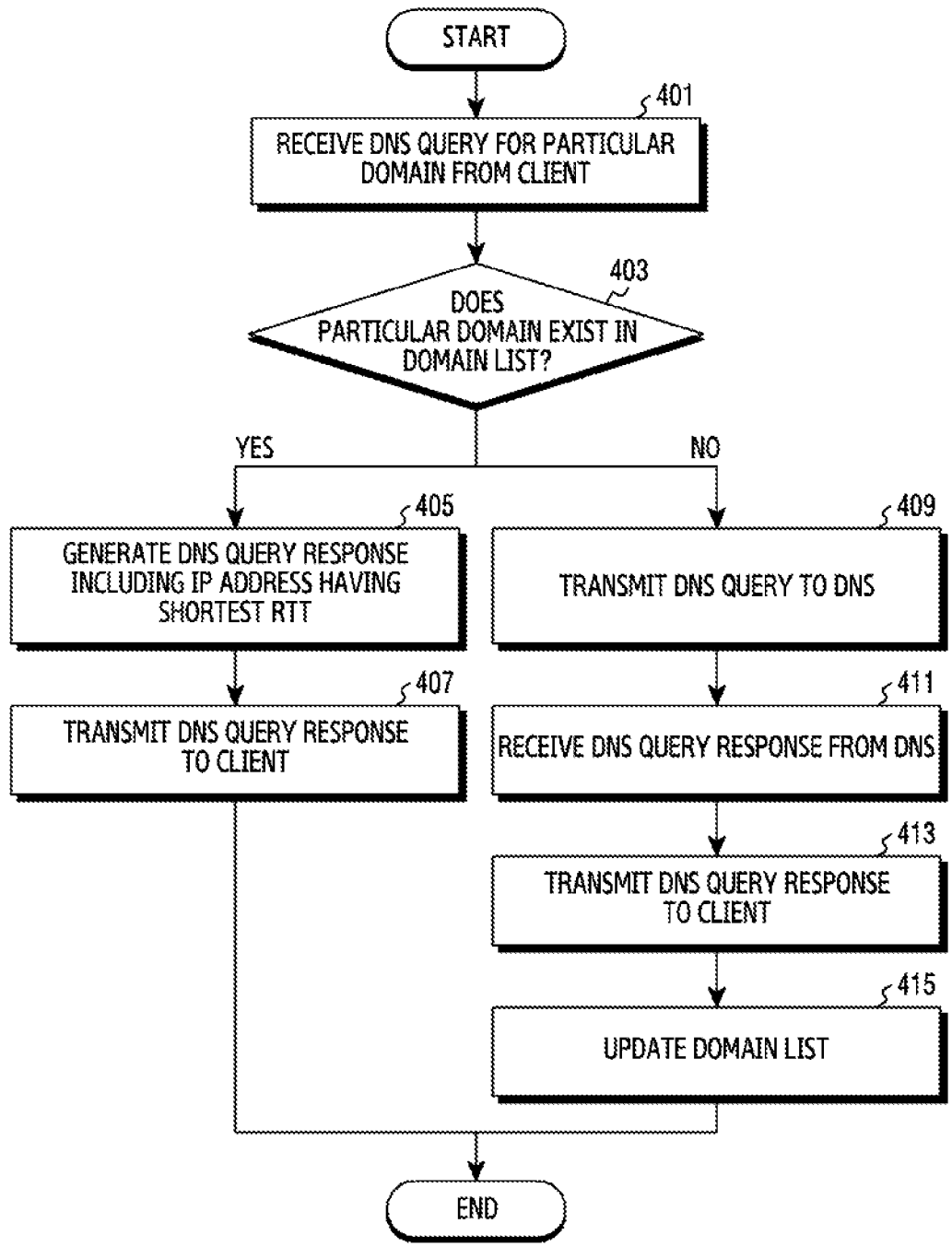
FIG. 4 illustrates a method of operating the proxy device based on domain information in the communication system according to various embodiments of the present disclosure.

FIG. 4 illustrates a method of operating the proxy device based on domain information in the communication system according to various embodiments of the present disclosure. FIG. 4 illustrates an operation method of the proxy device 110.

Referring to FIG. 4, in step 401, the proxy device receives a DNS query for a particular domain from a client device (for example, the terminal 120). For example, the proxy device may receive a DNS query message when the client device executes an application such as a web-surfing application.

Thereafter, in step 403, the proxy device determines whether the particular domain is present in a domain list. According to an embodiment, the proxy device determines whether information on the DNS query for the particular domain is included in a DNS table. For example, the DNS table including the DNS query information on the domain list may be configured as [Table 1].

TABLE 1

| Domain | Last Used | Last Updated (Domain) | CNAME | IP Address | RTT (ms) | Last Updated (RTT) |
|---|---|---|---|---|---|---|
| samsung.com | 2017.05.11 17:14:29 | 2017.05.11 15:40:00 | samsung.com | 1.1.1.1 | 20 | 2017.05.11 15:50:31 |
| | | | samsung.com | 1.1.2.1 | 30 | 2017.05.11 15:50:31 |
| | | | samsung.com | 1.2.1.1 | 100 | 2017.05.10 12:10:51 |
| | | | samsung.com | 2.1.1.1 | 80 | 2017.05.11 13:20:11 |
| aaa.com | 2017.05.10 11:20:20 | 2017.05.11 15:40:00 | aaa.bbb.com | 3.3.3.3 | 150 | 2017.05.11 15:50:31 |
| | | | aaa.bbb.com | 3.3.3.4 | 160 | 2017.05.11 15:50:31 |
| | | | ddd.bbb.com | 6.1.1.1 | 210 | 2017.05.10 12:10:51 |
| ccc.com | 2017.05.09 09:14:23 | 2017.05.11 15:40:00 | ccc.com | 10.0.0.1 | 30 | 2017.05.11 15:50:31 |

The DNS table as shown in [Table 1] may include a time (Last Used) at which the last query for the corresponding domain from the terminal was executed, a time (Last Updated(Domain)) at which the domain list was most recently updated, a CNAME (canonical name) for the domain, an IP address corresponding to the CNAME, RTT (ms) between the server corresponding to the IP address and the proxy device, and a time (Last Updated (RRTT)) at which the RTT was most recently updated.

When the information on the particular domain is included in the DNS table, the proxy device performs step 405. However, when the information on the particular domain is not included in the DNS table, the proxy device performs step 409.

When the information on the particular domain is included in the DNS table, the proxy device generates a DNS query response message including the IP address having the shortest RTT in the DNS table in step 405. For example, when multiple IP addresses corresponding to the particular domain are present in the DNS table, the proxy device may transmit a DNS query response message including only the IP address having the shortest RTT or including some or all of the IP addresses in ascending order, starting with the shortest RTT.

Thereafter, in step 407, the proxy device transmits the DNS query response message to the client device. For example, the proxy device may transmit the DNS query response message including at least one IP address corresponding to the particular domain for which a DNS query was executed. At least one IP address may include one IP address having the shortest RTT or a plurality of IP addresses that are arranged in ascending order, starting with the shortest RTT.

When the information on the particular domain is not included in the DNS table, the proxy device transmits the DNS query for the corresponding domain to the DNS (for example, the DNS server 130) in step 409. For example, the proxy device may transmit the DNS query to a pre-defined DNS.

Thereafter, in step 411, the proxy device receives a DNS query response from the DNS. For example, the proxy device may receive a DNS query response message including at least one IP address from the DNS in response to the DNS query for the corresponding domain.

In step 413, the proxy device transfers the DNS query response to the client device. For example, the proxy device may transmit the DNS query response message including at least one corresponding IP address to the client device based on the DNS query response message received from the DNS.

In step 415, the proxy device updates the domain list based on the DNS query response. For example, the proxy device may add the domain list of the DNS table according to the DNS query response received from the DNS for the corresponding domain and add at least one corresponding IP address or update time.

Figure 5:
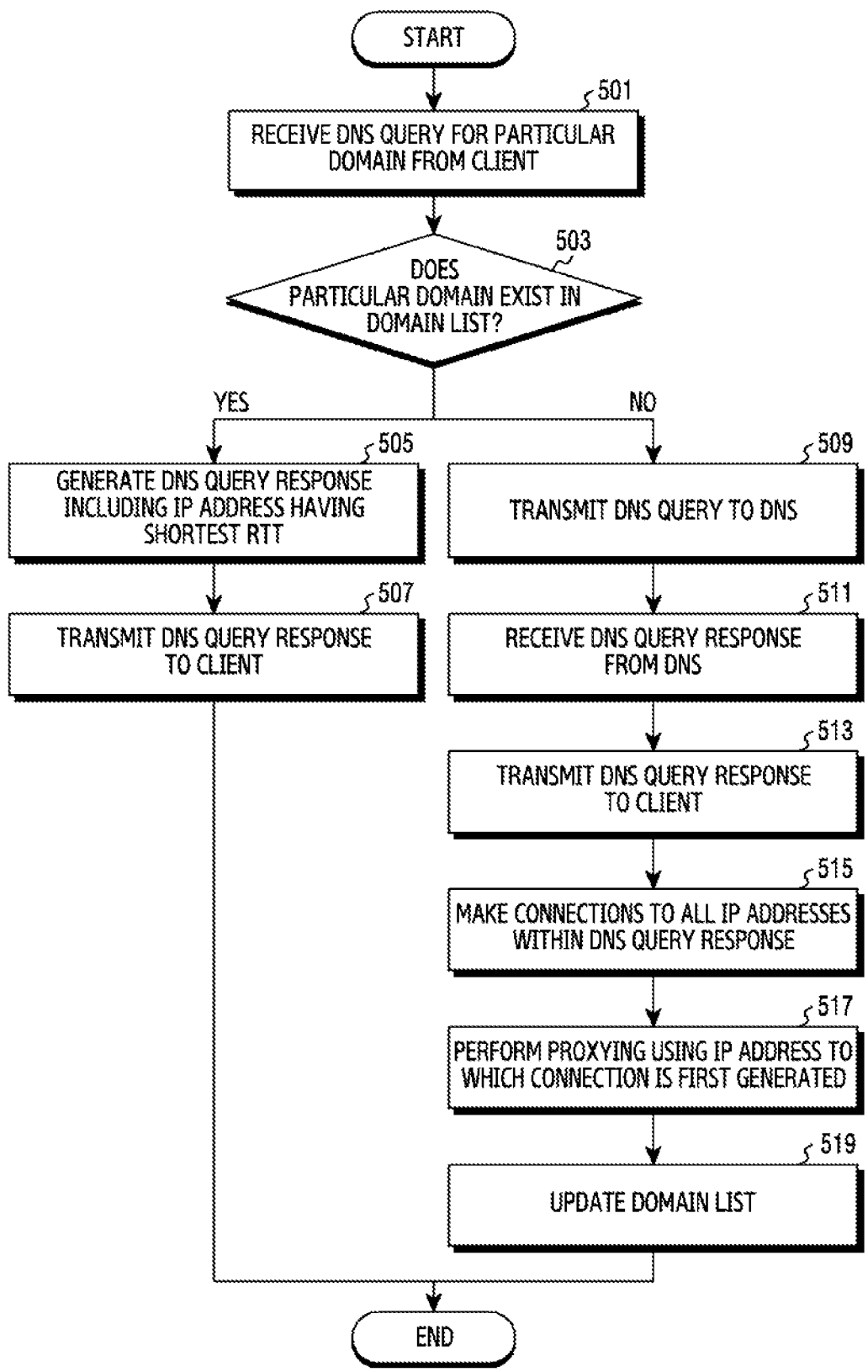
FIG. 5 illustrates a method of operating the proxy device to generate connection to one or more Internet Protocol (IP) addresses in order to minimize a connection delay in the communication system according to various embodiments of the present disclosure.

FIG. 5 illustrates a method of operating the proxy device to generate connections to one or more IP addresses in order to minimize a connection delay in the communication system according to various embodiments of the present disclosure. FIG. 5 illustrates an operation method of the proxy device 110.

Referring to FIG. 5, in step 501, the proxy device receives a DNS query for a particular domain from a client device (for example, the terminal 120). For example, the proxy device may receive a DNS query message as the client device executes an application such as a web-surfing application.

Thereafter, in step 503, the proxy device determines whether the particular domain is present in a domain list. According to an embodiment, the proxy device determines whether information on the DNS query for the particular domain is included in the DNS table. For example, the DNS table including the DNS query information for the domain list may be configured as [Table 1] above. When the information on the particular domain is included in the DNS table, the proxy device performs step 505. However, when the information on the particular domain is not included in the DNS table, the proxy device performs step 509.

When the information on the particular domain is included in the DNS table, the proxy device generates a DNS query response message including the IP address having the shortest RTT in the DNS table in step 505. For example, when the number of IP addresses corresponding to the particular domain is plural in the DNS table, the proxy device may transmit a DNS query response message including only the IP address having the Shortest RTT or including some or all of the IP addresses in ascending order, starting with the shortest RTT.

Thereafter, in step 507, the proxy device transmits the DNS query response message to the client device. For example, the proxy device may transmit the DNS query response message including at least one IP address corresponding to the particular domain for which a DNS query was executed. At least one IP address may include one IP address having the shortest RTT or a plurality of IP addresses that are arranged in ascending order, starting with the shortest RTT.

When the information on the particular domain is not included in the DNS table, the proxy device transmits the DNS query for the corresponding domain to the DNS (for example, the DNS server 130) in step 509. For example, the proxy device may transmit the DNS query to a pre-defined DNS.

Thereafter, in step 511, the proxy device receives a DNS query response from the DNS. For example, the proxy device may receive a DNS query response message including at least one IP address from the DNS in response to the DNS query for the corresponding domain.

In step 513, the proxy device transfers the DNS query response to the client device. For example, the proxy device may transmit the DNS query response message including at least one corresponding IP address to the client device based on the DNS query response message received from the DNS.

In step 515, the proxy device establishes the connections to all IP addresses within the DNS query. For example, the proxy device may measure a response time while generating the connections to all of the corresponding IP addresses based on the DNS query response message received from the DNS.

In step 517, the proxy device performs proxying by using the IP address to which the connection is first generated. For example, the proxy device may generate the connections to all IP addresses corresponding to the corresponding domain and relay the connection to the IP address to which the connection is first generated.

In step 519, the proxy device updates the domain list based on the DNS query response. For example, the proxy device may add the domain list of the DNS table according to the DNS query response received from the DNS for the corresponding domain and add at least one corresponding IP address or update time. The proxy device may add RTT information to the DNS table based on a response time when the connections to all IP addresses are generated.

Figure 6:
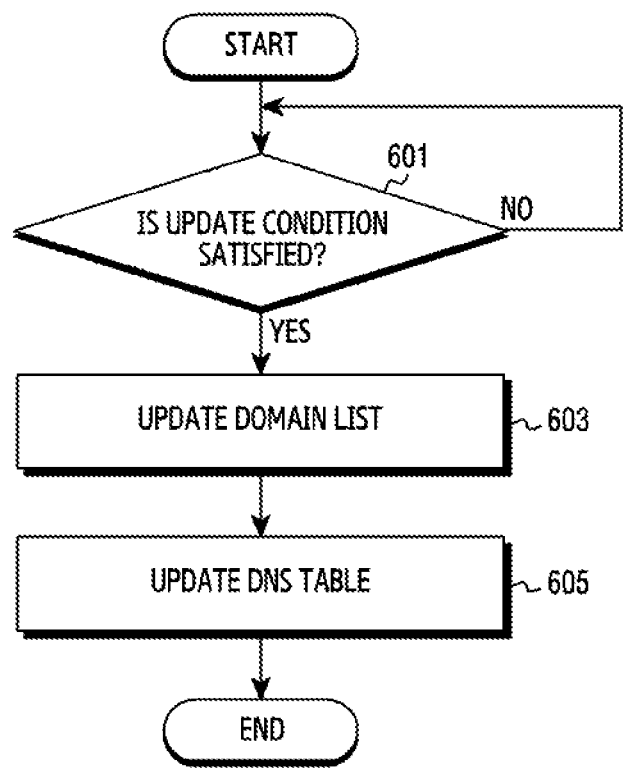
FIG. 6 illustrates a method of operating the proxy device to update a DNS table based on a condition in the communication system according to various embodiments of the present disclosure.

FIG. 6 illustrates a method of operating the proxy device to update the DNS table based on conditions in the communication system according to various embodiments of the present disclosure. FIG. 6 illustrates an operation method of the proxy device 110.

Referring to FIG. 6, in step 601, the proxy device determines whether a condition to update the domain list within the DNS table is satisfied. For example, the proxy device may update the domain list according to the condition periodically or on demand 1) when a predetermined time passes after the time (Last Used) at which the last query for the domain was executed, 2) when a DNS query for a new domain is received from the user, 3) when top 100 traffic sites are updated, 4) when the size of the DNS table is larger than or equal to a predetermined size, 5) when at least one of the conditions under which domain list items are higher than or equal to a predetermined value is satisfied. In order to identify the update of top 100 traffic sites under the third condition or to receive information on the top 100 sites, the proxy device may communicate with an external server (for example, the information server 160). When the update condition is satisfied, the proxy device performs step 603. However, when the update condition is not satisfied, the proxy device repeats step 601.

When the update condition is satisfied, the proxy device updates the domain list in step 603.

Thereafter, in step 605, the proxy device updates the DNS table. According to an embodiment, the proxy device may update the domain list according to the update condition periodically or on demand and update the DNS table according to the updated domain list. The DNS table may be updated by adding the DNS query result of the updated domain list. For example, the DNS table including the DNS query information on the domain list may be configured as [Table 1].

Figure 7:
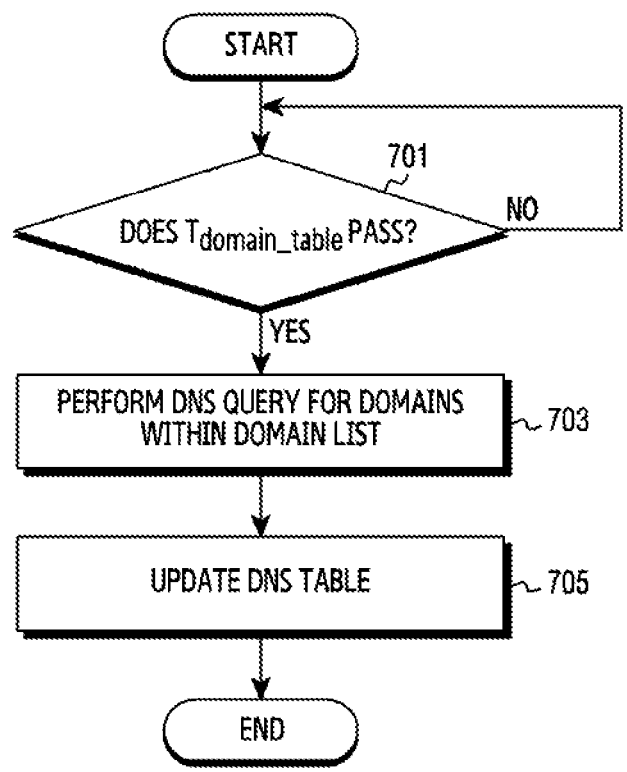
FIG. 7 illustrates a method of operating the proxy device to periodically update the DNS table in the communication system according to various embodiments of the present disclosure.

FIG. 7 illustrates a method of operating the proxy device to update the DNS table periodically in the communication system according to various embodiments of the present disclosure. FIG. 7 illustrates an operation method of the proxy device 110.

Referring to FIG. 7, in step 701, the proxy device determines whether a preset time passes. For example, the proxy device may determine whether $T_{domain\_table}$, which is a preset time to update the DNS table, passes. When $T_{domain\_table}$ passes, the proxy device performs step 703. However, when $T_{domain\_table}$ does not pass, the proxy device repeats step 701.

When $T_{domain\_table}$ passes, the proxy device performs the DNS query for domains within the domain list in step 703. For example, the proxy device may perform the DNS query for domains within the domain list periodically according to a $T_{domain\_table}$ value. At this time, the domain table value. proxy device may transmit the DNS query to the pre-defined DNS (for example, the DNS server 130) and receive a DNS query response from the DNS.

Thereafter, in step 705, the proxy device updates the DNS table. According to an embodiment, the proxy device may update the DNS table based on at least one IP address included in the DNS query response for the DNS query. For example, the proxy device may update an IP address column of the DNS table like [Table 1] according to the DNS query result.

Figure 8:
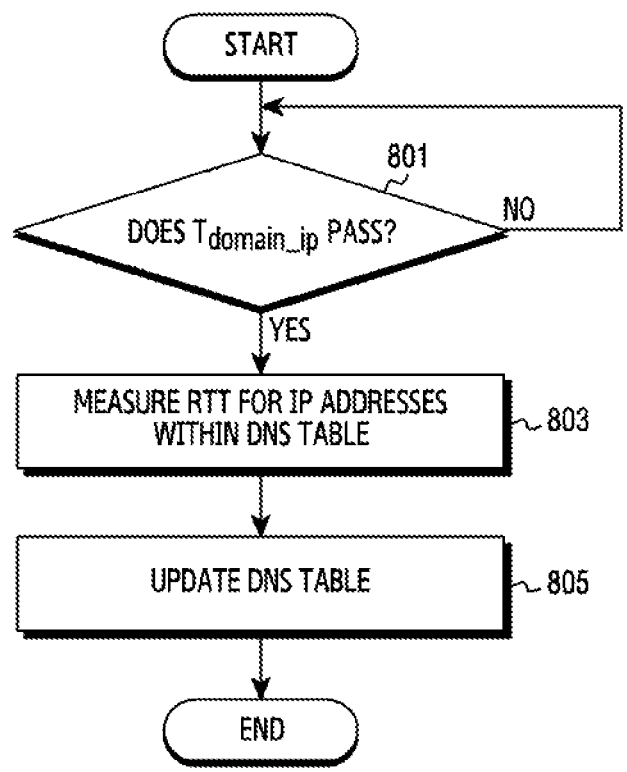
FIG. 8 illustrates a method of operating the proxy device to periodically update the DNS table for each IP address in the communication system according to various embodiments of the present disclosure.

FIG. 8 illustrates a method of operating the proxy device to periodically update the DNS table for each IP address in the communication system according to various embodiments of the present disclosure. FIG. 8 illustrates an operation method of the proxy device 110.

Referring to FIG. 8, in step 801, the proxy device determines whether a preset time passes. For example, the proxy device may determine whether $T_{domain\_ip}$, which is a preset time to update the DNS table, passes. When $T_{domain\_ip}$ passes, the proxy device performs step 803. However, when $T_{domain\_ip}$ has not passed, the proxy device repeats step 801.

When $T_{domain\_ip}$ passes, the proxy device measures RTT for IP addresses within the DNS table in step 803. For example, the proxy device may measure RTT through signal transmission/reception to/from IP addresses within the DNS table periodically according to the $T_{domain\_ip}$ value. According to an embodiment, the RTT measurement method may include at least one of Internet Control Message protocol (ICMP) ping RTT, RTT in a Transmission Control Protocol (TCP) three-way handshake, and RTT in an HTTP GET request-response.

Thereafter, in step 805, the proxy device updates the DNS table. According to an embodiment, the proxy device may update the DNS table based on the RTT values measured for IP addresses within the DNS table. At this time, all IP addresses within the DNS table may be updated, or only some of the IP addresses may be updated. For example, the update of RTT of particular IP addresses may be not necessary because the RTT of the particular IP address within the same domain is much longer than others, IP addresses within the same domain are located at the same region and have similar RTT, or it has not been long since the corresponding domain was added. In this case, the proxy device may measure RTT except for the corresponding IP addresses and update the DNS table according to the RTT measurement result. For example, the proxy device may update an RTT column of the DNS table like [Table 1] according to the DNS query result.

According to an embodiment, when attempting connection to an original server corresponding to a particular domain, the client device (for example, the terminal 120) may receive redirect information. When receiving the redirect information, a DNS query to a new domain may be needed, and a delay may be generated for a time for which the connection to the original server is attempted. The original server is a server that, when receiving a message from the client device, redirects the message to a Uniform Resource Locator (URL) for another server or another URL within the same server.

In an improved method with regard to this, the proxy device (for example, the proxy device 110 (CPE, which is a device for providing an Internet service within the home)) located close to the client device may directly generate and transmit a redirect message for the message from the client device as necessary, thereby removing the delay due to communication between the client device and the original server. To this end, the proxy device may manage a redirect list including a redirect trigger message and a corresponding IP address.

As described above, a new method of preventing the delay due to the conventional redirect and improving user QoE is required. The present disclosure may increase the wide use of the technology by presenting a redirect control method to improve QoE of the user only through modification of the proxy device without any modification of the server/terminal/application. According to various embodiments of the present disclosure, a more detailed procedure for controlling the redirect connection of the proxy device may be performed as illustrated in FIGS. 9 to 13.

Figure 9:
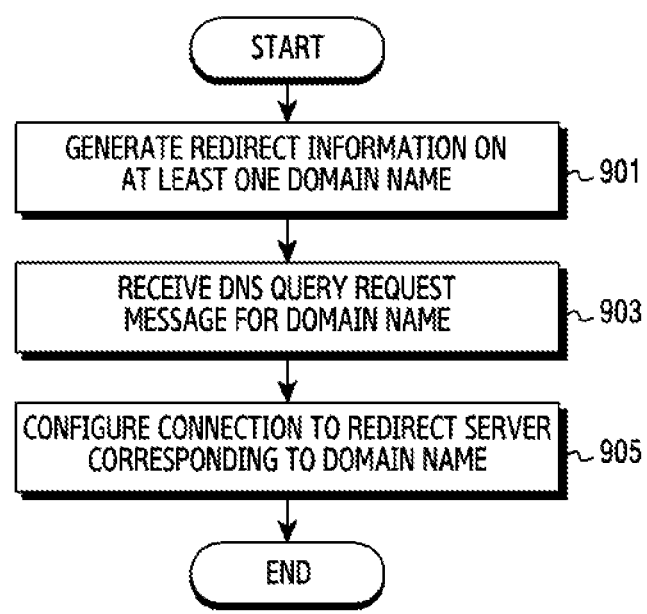
FIG. 9 illustrates a method of operating the proxy device to control the redirect connection in the communication system according to various embodiments of the present disclosure.

FIG. 9 illustrates a method of operating the proxy device for controlling the redirect connection in the communication system according to various embodiments of the present disclosure. FIG. 9 illustrates an operation method of the proxy device 110.

Referring to FIG. 9, in step 901, the proxy device generates redirect information on at least one domain name. For example, the proxy device may generate or update redirect information on at least one domain name periodically or on demand. According to an embodiment, the proxy device may generate or update a domain list including at least one domain name based on real-time traffic of client devices (for example, the terminal 120), a traffic history, and top 100 traffic sites. For example, the proxy device may receive top 100 site information from an external server (for example, the information server 160). For example, the proxy device may transmit a message for IP addresses acquired through a DNS query for the domain list periodically or on demand and generate or update a redirect list including redirect IP addresses received as a response. For example, the redirect list including the redirect IP addresses may be configured as [Table 2].

TABLE 2

| Domain | Redirect Server IP | Redirect-trigger Message | Redirect Message |
|---|---|---|---|
| www.samsung.com | 1.1.1.1 | 1) HTTP GET, Header Info, etc. | Redirect to https://www.samsung.com |
| aaa.com | 2.2.2.2 | 1) HTTP GET, Header Info, etc. 2) HTTP POST, Header Infor, etc. | Redirect to http://bbb.com |

The redirect list in [Table 2] may include a domain, an IP of a server to which the corresponding domain is redirected (redirect server IP), a message that the terminal transmits to the corresponding domain server (redirect-trigger message), and a redirect message that the corresponding domain server transmits.

Thereafter, in step 903, the proxy device receives a DNS query message for the domain name from the client device. According to an embodiment, the proxy device may receive the DNS query message as the client device executes an application such as a web-surfing application.

In step 905, the proxy device establishes the connection to a redirect server corresponding to the domain name. For example, the proxy device may search for a redirect list for the corresponding domain name and transmit a message that makes a request for establishing the connection to a corresponding redirect IP address. At this time, the proxy device may search for DNS query information and transmit a response message of the DNS query to the client device. The response message may include a single IP address having the smallest RTT value or a plurality of IP addresses sequentially arranged in ascending order, starting with the shortest RTT. According to an embodiment, when there is no DNS query information generated for the corresponding domain name, the proxy device may perform the DNS query to the DNS (for example, the DNS server 130) and establish the connection to the redirect IP address acquired from the corresponding IP address. At this time, the proxy device may update the DNS table and the redirect list for the corresponding domain name.

Figure 10:
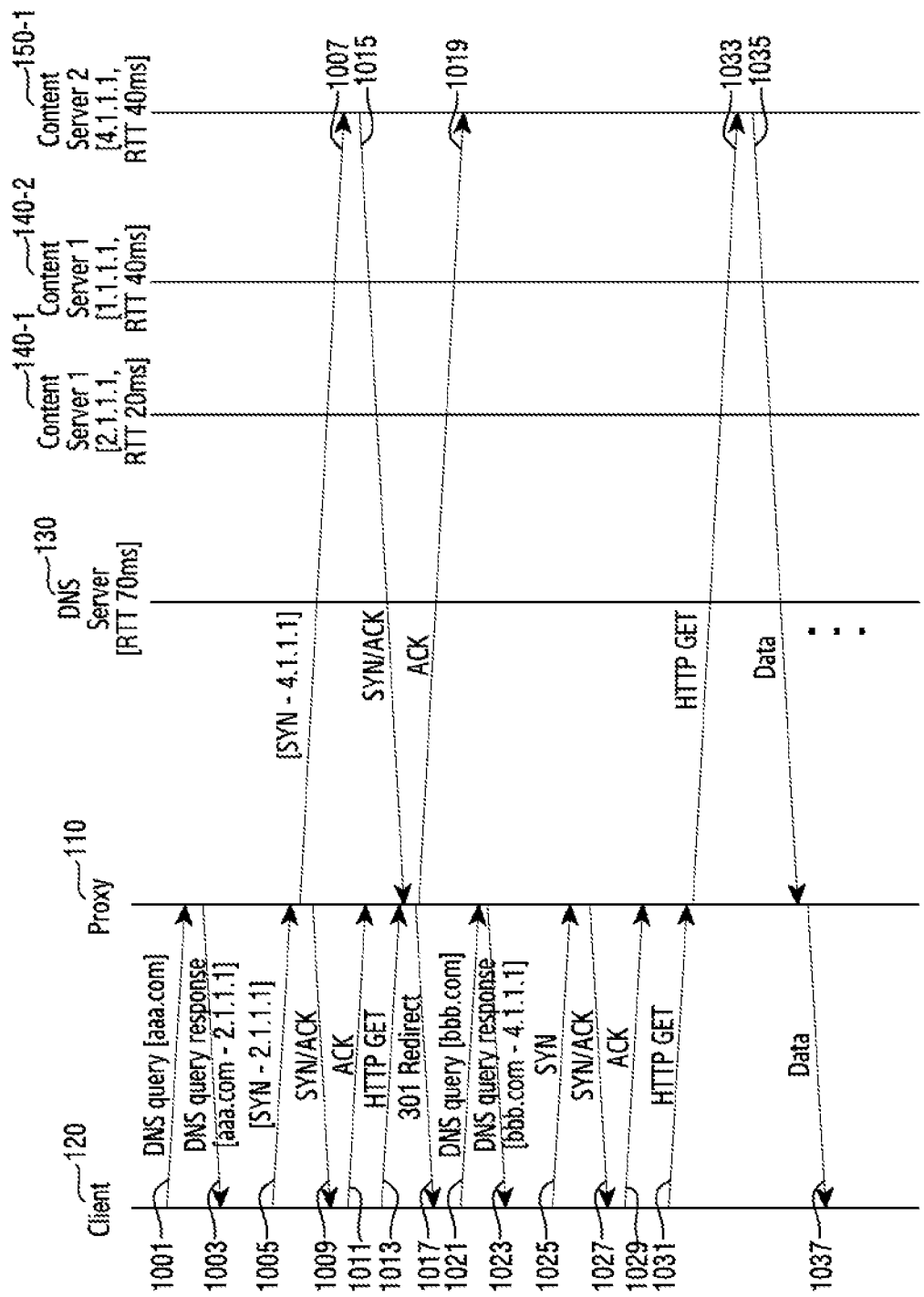
FIG. 10 illustrates the flow of operation of the proxy device for controlling the connection according to redirect information on a domain in the communication system according to various embodiments of the present disclosure.

FIG. 10 illustrates the flow of operation of the proxy device for controlling the connection according to redirect information on a domain in the communication system according to various embodiments of the present disclosure. FIG. 10 illustrates an operation method of the proxy device 110.

Referring to FIG. 10, in step 1001, the proxy device receives a DNS query for a particular domain from the client device (for example, the terminal 120). For example, as the client device executes an application such as a web-surfing application, the proxy device may receive a DNS query message for a domain name such as aaa.com.

Thereafter, in step 1003, the proxy device transmits the DNS query response message to the client device. According to an embodiment, the proxy device may identify the DNS table and transmit a DNS query response message including an IP address corresponding to the particular domain. For example, the proxy device may identify one or more IP addresses corresponding to aaa.com in the DNS table and transmit a DNS query response message including an IP address 2.1.1.1 of the shortest RTT. For example, when the number of IP addresses corresponding to the particular domain is plural in the DNS table, the proxy device may transmit a DNS query response message including only the IP address having the Shortest RTT or including some or all of the IP addresses in ascending order, starting with the shortest RTT. The DNS table may be configured as [Table 1] above.

In step 1005, the proxy device receives a message that makes a request for the connection to the corresponding IP address from the client device. For example, the proxy device may receive a connection request message for the IP address 2.1.1.1 corresponding to aaa.com from the client device. The message received from the client device may be a synchronous idle (SYN) message for synchronizing data transmission/reception timing.

Thereafter, in step 1007, the proxy device makes a request for connection to a redirect server (for example, the content server 150-1) for the corresponding domain. For example, the proxy device may transmit a connection request message to an IP address 4.1.1.1 of a server bbb.com to which requests for aaa.com are to be redirected. The message transmitted by the proxy device may be a SYN message for synchronization.

In step 1009, the proxy device transmits a response message of the connection request to the client device. For example, the proxy device may transmit a SYN/acknowledgement (ACK) message of the SYN message of the client device.

Thereafter, in step 1011, the proxy device receives a response message of the connection request message from the client device. For example, the proxy device may receive an ACK message of the SYN/ACK message from the client device.

In step 1013, the proxy device receives a message for data transmission from the client device. For example, the proxy device may receive an HTTP GET message for transmitting data through HTTP communication from the client device.

In step 1015, the proxy device receives a response message of the connection request message from the redirect server. For example, the proxy device may receive the SYN/ACK message of the SYN message from the redirect server.

In step 1017, the proxy device transmits a redirect message to the client device. For example, the proxy device may determine that the HTTP GET message received in step 1013 matches a redirect trigger message within the redirect list. The proxy device may generate a redirect message based on the redirect message within the redirect list and transmit the generated message to the client device. The redirect message may be a 301 Redirect message. The redirect list may be configured as [Table 2] above. According to an embodiment, the 301 Redirect message may include information on bbb.com, to which requests for the domain aaa.com, requested by the client device, are to be redirected.

In step 1019, the proxy device transmits a response message to the redirect server. For example, the proxy device may transmit an ACK message to the redirect server in response to the SYN/ACK message received in step 1015.

In step 1021, the proxy device receives a DNS query for the domain included in the redirect message from the client device. For example, the proxy device may receive a DNS query message for the domain name bbb.com, to which requests for aaa.com are to be redirected, from the client device.

Thereafter, in step 1023, the proxy device transmits the DNS query response message to the client device. According to an embodiment, the proxy device may identify the DNS table and transmit a DNS query response message including an IP address corresponding to the domain to be redirected. For example, the proxy device may identify one or more IP addresses corresponding to bbb.com in the DNS table and transmit a DNS query response message including the IP address 4.1.1.1 of the shortest RTT. For example, when the number of IP addresses corresponding to the particular domain is plural in the DNS table, the proxy device may transmit a DNS query response message including only the IP address having the Shortest RTT or including some or all of the IP addresses in ascending order, starting with the shortest RTT.

In step 1025, the proxy device receives a message that makes a request for the connection to the corresponding IP address from the client device. For example, the proxy device may receive a connection request message for the IP address 4.1.1.1, corresponding to bbb.com, from the client device. The message received from the client device may be a SYN message for synchronizing data transmission/reception timing.

In step 1027, the proxy device transmits a response message of the connection request to the client device. For example, the proxy device may transmit a SYN/ACK message of the SYN message of the client device.

Thereafter, in step 1029, the proxy device receives a response message of the connection request message from the client device. For example, the proxy device may receive an ACK message of the SYN/ACK message from the client device.

In step 1031, the proxy device receives a message for data transmission from the client device. For example, the proxy device may receive an HTTP GET message for transmitting data through HTTP communication from the client device.

In step 1033, the proxy device transmits a message for data transmission to the redirect server. For example, the proxy device may transmit an HTTP GET message for transmitting data through HTTP communication to the redirect server.

In step 1035, the proxy device receives data from the redirect server. For example, the proxy device may receive data from the redirect server through HTTP communication.

Thereafter, in step 1037, the proxy device transmits data to the client device. For example, the proxy device may transmit data received from the redirect server to the client device.

Figure 11:
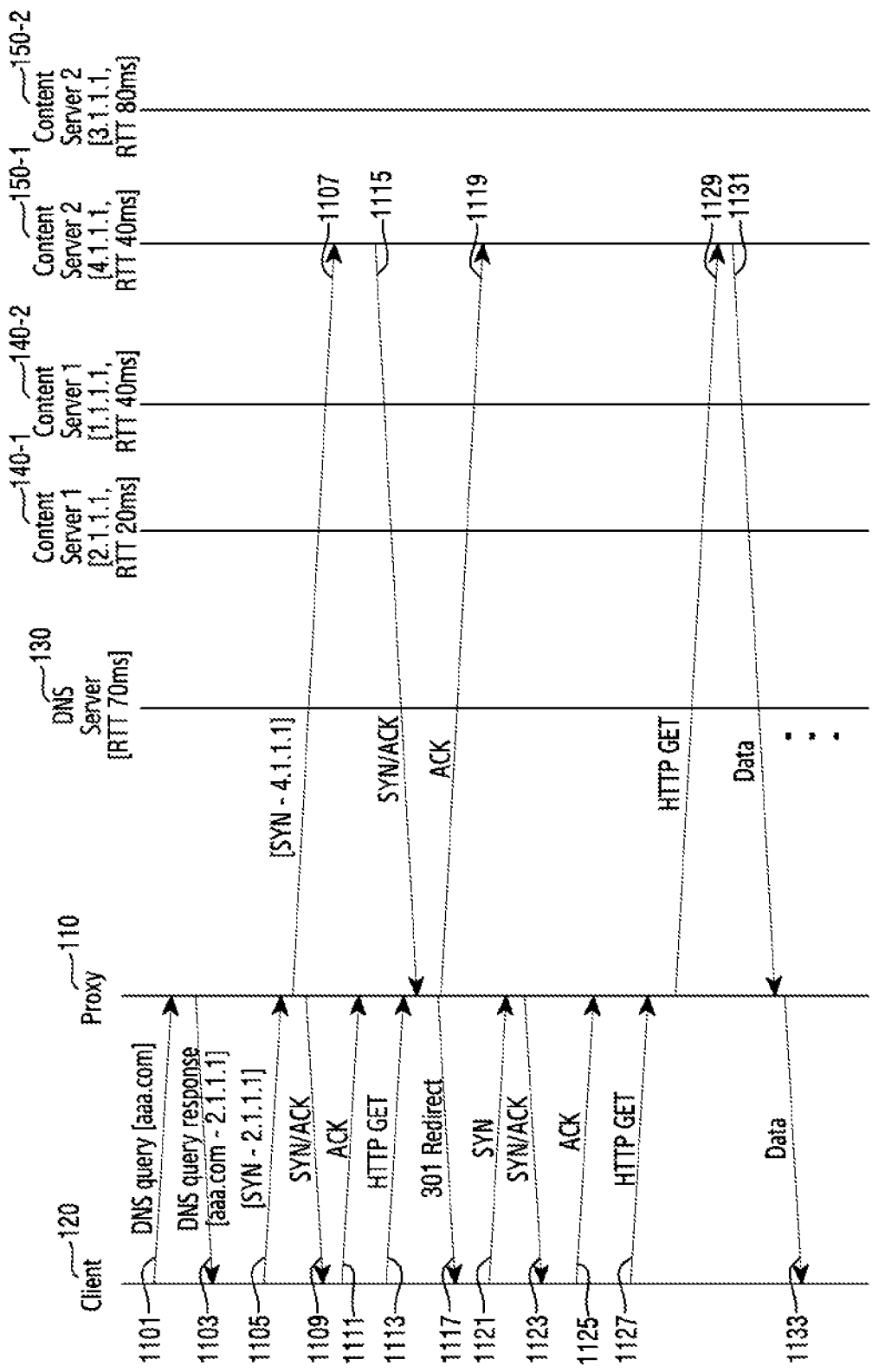
FIG. 11 illustrates the flow of operation of the proxy device for preventing a connection delay based on redirect information on a domain in the communication system according to various embodiments of the present disclosure.

FIG. 11 illustrates the flow of operation of the proxy device for preventing a connection delay based on redirect information on a domain in the communication system according to various embodiments of the present disclosure. FIG. 11 illustrates an operation method of the proxy device 110.

Referring to FIG. 11, in step 1101, the proxy device receives a DNS query for a particular domain from the client device (for example, the terminal 120). For example, as the client device executes an application such as a web-surfing application, the proxy device may receive a DNS query message for a domain name such as aaa.com.

Thereafter, in step 1103, the proxy device transmits the DNS query response message to the client device. According to an embodiment, the proxy device may identify the DNS list and transmit a DNS query response message including an IP address corresponding to the particular domain. For example, the proxy device may identify one or more IP addresses corresponding to aaa.com in the DNS list and transmit a DNS query response message including the IP address 2.1.1.1 of the shortest RTT. For example, when the number of IP addresses corresponding to the particular domain is plural in the DNS table, the proxy device may transmit a DNS query response message including only the IP address having the Shortest RTT or including some or all of the IP addresses in ascending order, starting with the shortest RTT. The DNS table may be configured as [Table 1] above.

In step 1105, the proxy device receives a message that makes a request for the connection to the corresponding IP address from the client device. For example, the proxy device may receive a connection request message for the IP address 2.1.1.1, corresponding to aaa.com, from the client device. The message received from the client device may be a SYN message for synchronizing data transmission/reception timing.

Thereafter, in step 1107, the proxy device makes a request for connection to a redirect server (for example, the content server 150-1) for the corresponding domain. For example, the proxy device may transmit a connection request message to the IP address 4.1.1.1 of a server bbb.com to which requests for aaa.com are to be redirected. The number of IP addresses of the server to which requests are to be redirected may be plural, and the proxy device may transmit a connection request message to the IP address having the shortest RTT among the IP addresses (for example, connection to the content server 150-1 because RTT of the content server 150-1 is 40 ms which is shorter than 80 ms of RTT of the content server 150-2). The message transmitted by the proxy device may be a SYN message for synchronization.

In step 1109, the proxy device transmits a response message of the connection request to the client device. For example, the proxy device may transmit a SYN/ACK message of the SYN message of the client device.

Thereafter, in step 1111, the proxy device receives a response message of the connection request message from the client device. For example, the proxy device may receive an ACK message of the SYN/ACK message from the client device.

In step 1113, the proxy device receives a message for data transmission from the client device. For example, the proxy device may receive an HTTP GET message for transmitting data through HTTP communication from the client device.

In step 1115, the proxy device receives a response message of the connection request message from the redirect server. For example, the proxy device may receive the SYN/ACK message of the SYN message from the redirect server.

In step 1117, the proxy device transmits a redirect message to the client device. For example, the proxy device may determine that the HTTP GET message received in step 1113 matches a redirect trigger message within the redirect list. The proxy device may generate a redirect message based on the redirect message within the redirect list and transmit the generated message to the client device. The redirect message may be a 301 Redirect message. The redirect list may be configured as shown in [Table 2] above. According to an embodiment, the 301 Redirect message may include information on the redirect IP address 4.1.1.1 instead of the redirect domain name for the domain aaa.com requested by the client device. Compared to the process of FIG. 10, it is possible to further reduce the connection establishment delay due to omission of the DNS query process by transmitting the 301 Redirect message including the redirect IP address. The redirect IP address may be the IP address having the shortest RTT.

In step 1119, the proxy device transmits a response message to the redirect server. For example, the proxy device may transmit an ACK message to the redirect server in response to the SYN/ACK message received in step 1115.

In step 1121, the proxy device receives a message that makes a request for connection to the corresponding IP address from the client device. For example, the proxy device may receive a connection request message for the IP address 4.1.1.1 from the client device. The message received from the client device may be a SYN message for synchronizing data transmission/reception timing.

In step 1123, the proxy device transmits a response message of the connection request to the client device. For example, the proxy device may transmit a SYN/ACK message of the SYN message of the client device.

Thereafter, in step 1125, the proxy device receives a response message of the connection request message from the client device. For example, the proxy device may receive an ACK message of the SYN/ACK message from the client device.

In step 1127, the proxy device receives a message for data transmission from the client device. For example, the proxy device may receive an HTTP GET message for transmitting data through HTTP communication from the client device.

In step 1129, the proxy device transmits a message for data transmission to the redirect server. For example, the proxy device may transmit an HTTP GET message for transmitting data through HTTP communication to the redirect server.

In step 1131, the proxy device receives data from the redirect server. For example, the proxy device may receive data from the redirect server through HTTP communication.

Thereafter, in step 1133, the proxy device transmits data to the client device. For example, the proxy device may transmit data received from the redirect server to the client device.

Figure 12:
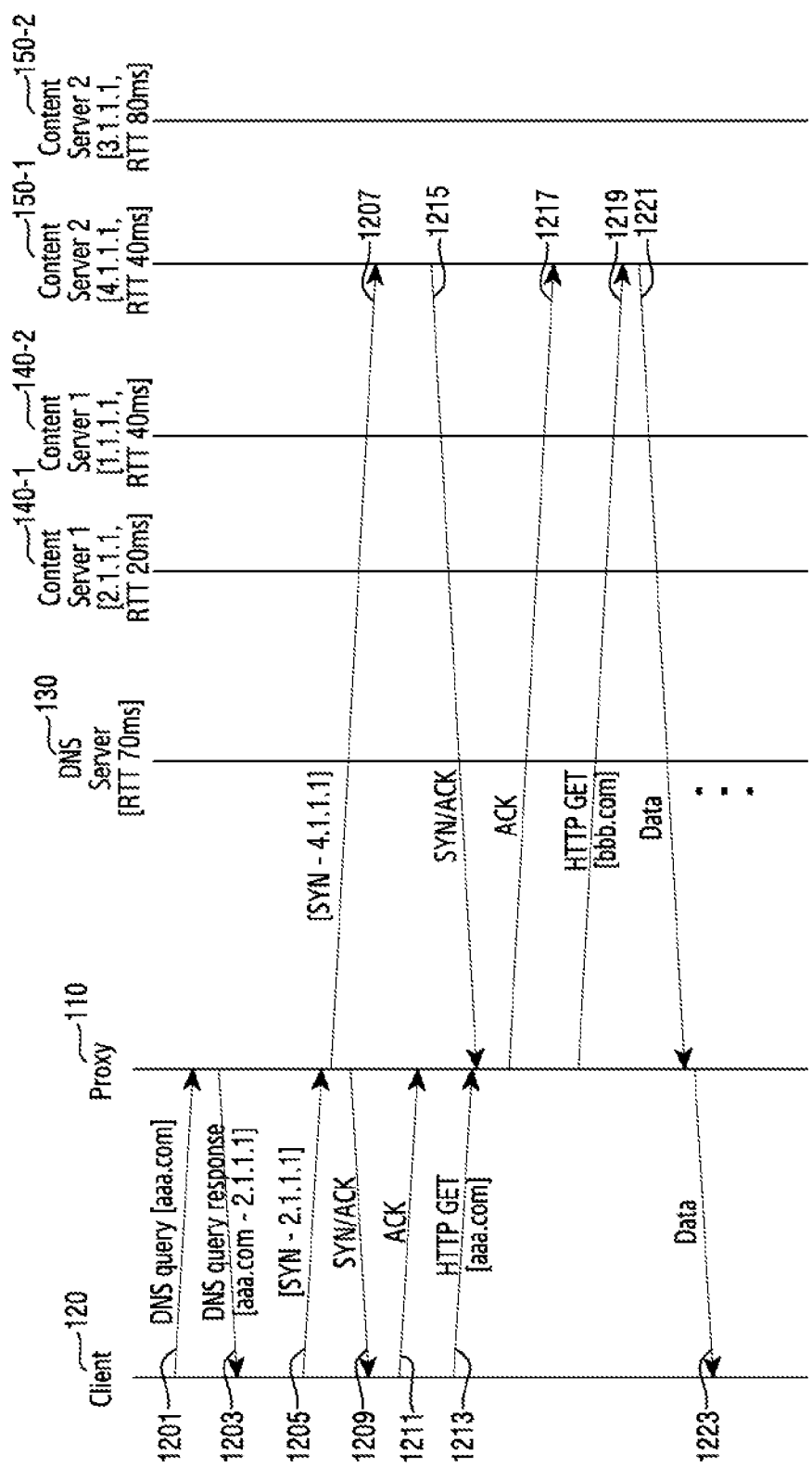
FIG. 12 illustrates the flow of operation of the proxy device for preventing a connection delay by omitting redirect message transmission/reception for a domain in the communication system according to various embodiments of the present disclosure.

FIG. 12 illustrates the flow of operation of the proxy device for preventing a connection delay by omitting redirect message transmission/reception for a domain in the communication system according to various embodiments of the present disclosure. FIG. 12 illustrates an operation method of the proxy device 110.

Referring to FIG. 12, in step 1201, the proxy device receives a DNS query for a particular domain from a client device (for example, the terminal 120). For example, as the client device executes an application such as a web-surfing application, the proxy device may receive a DNS query message for a domain name such as aaa.com.

Thereafter, in step 1203, the proxy device transmits the DNS query response message to the client device. According to an embodiment, the proxy device may identify the DNS list and transmit a DNS query response message including an IP address corresponding to the particular domain. For example, the proxy device may identify one or more IP addresses corresponding to aaa.com in the DNS list and transmit a DNS query response message including an IP address 2.1.1.1 of the shortest RTT. For example, when the number of IP addresses corresponding to the particular domain is plural in the DNS table, the proxy device may transmit a DNS query response message including only the IP address having the Shortest RTT or including some or all of the IP addresses in ascending order, starting with the shortest RTT. The DNS table may be configured as [Table 1] above.

In step 1205, the proxy device receives a message that makes a request for the connection to the corresponding IP address from the client device. For example, the proxy device may receive a connection request message for the IP address 2.1.1.1 corresponding to aaa.com from the client device. The message received from the client device may be a SYN message for synchronizing data transmission/reception timing.

Thereafter, in step 1207, the proxy device makes a request for connection to a redirect server (for example, the content server 150-1) for the corresponding domain. For example, the proxy device may transmit a connection request message to an IP address 4.1.1.1 of a server bbb.com to which requests for aaa.com are to be redirected. The number of IP addresses of the server to which requests are to be redirected may be plural, and the proxy device may transmit a connection request message to the IP address having the shortest RTT among the IP addresses (for example, connection to the content server 150-1 because the RTT of the content server 150-1 is 40 ms, which is shorter than 80 ms, which is the RTT of the content server 150-2). The message transmitted by the proxy device may be a SYN message for synchronization.

In step 1209, the proxy device transmits a response message of the connection request to the client device. For example, the proxy device may transmit a SYN/ACK message of the SYN message of the client device.

Thereafter, in step 1211, the proxy device receives a response message of the connection request message from the client device. For example, the proxy device may receive an ACK message of the SYN/ACK message from the client device.

In step 1213, the proxy device receives a message for data transmission from the client device. For example, the proxy device may receive an HTTP GET message for aaa.com from the client device.

In step 1215, the proxy device receives a response message of the connection request message from the redirect server. For example, the proxy device may receive the SYN/ACK message of the SYN message from the redirect server.

In step 1217, the proxy device transmits a response message to the redirect server. For example, the proxy device may transmit an ACK message to the redirect server in response to the SYN/ACK message received in step 1215.

In step 1219, the proxy device transmits a message for data transmission to the redirect server. For example, the proxy device may transmit an HTTP GET message for transmitting data through HTTP communication to the redirect server. The proxy device may further shorten a connection establishment time by omitting a process of generating and transmitting the redirect message to the client device. That is, the proxy device that received the request for establishing the connection to the IP address (for example, 2.1.1.1) corresponding to the domain name from the client device in step 1205 may omit transmission of the redirect message and directly transmit a connection request message to a corresponding redirect server IP address (4.1.1.1). In step 1213, the proxy device receiving the HTTP GET message may identify whether the HTTP GET message matches a redirect trigger message in the redirect list, change URL information of the HTTP GET to corresponding bbb.com through URL mapping, and transmit the HTTP GET message to the redirect server.

In step 1221, the proxy device receives data from the redirect server. For example, the proxy device may receive data from the redirect server through HTTP communication.

Thereafter, in step 1223, the proxy device transmits data to the client device. For example, the proxy device may transmit data received from the redirect server to the client device.

Figure 13:
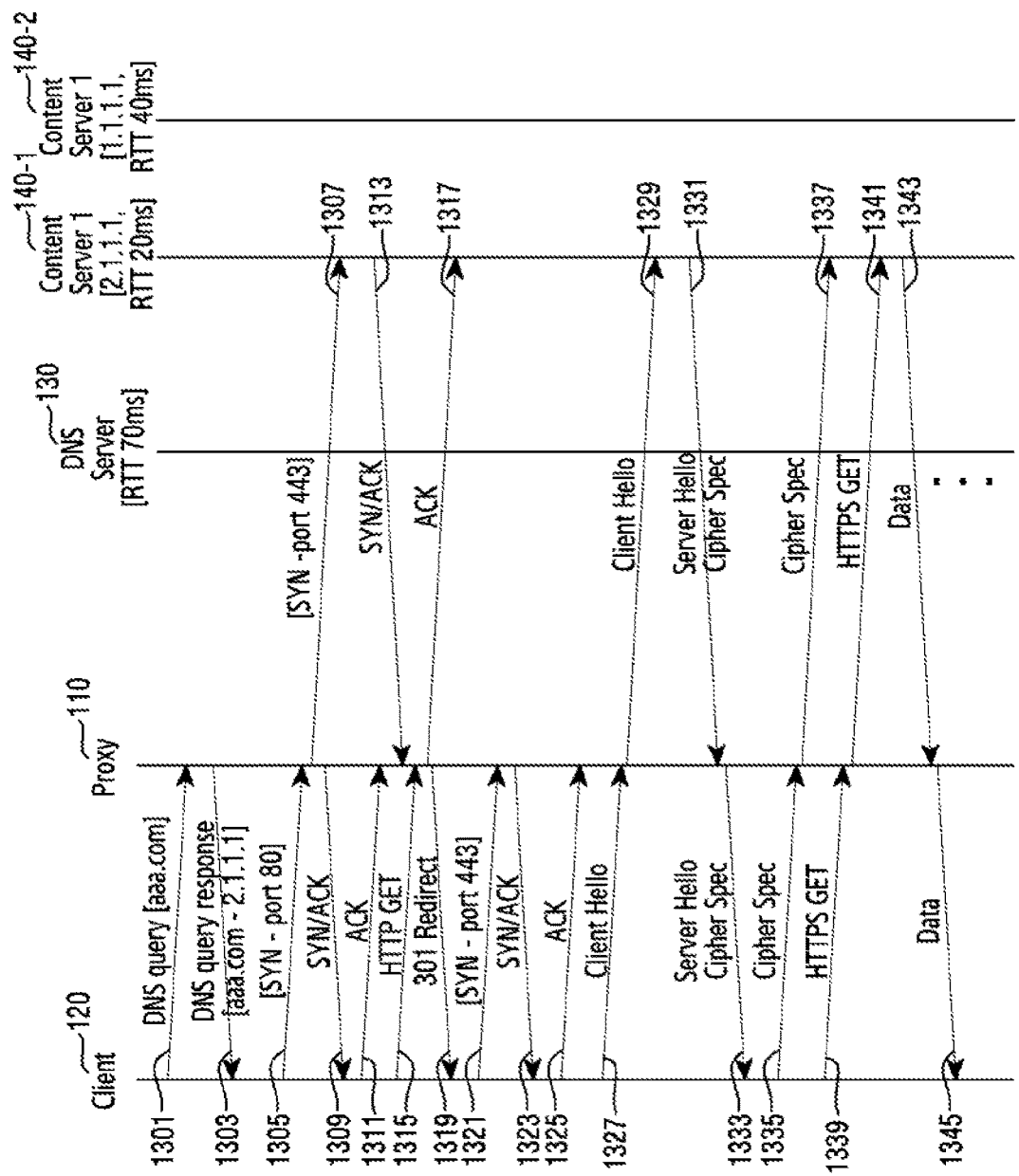
FIG. 13 illustrates the flow of operation of the proxy device upon redirection from Hyper Text Transfer Protocol (HTTP) to Hyper Text Transfer Protocol over Secure socket layer (HTTPS) in the communication system according to various embodiments of the present disclosure.

FIG. 13 illustrates the flow of operation of the proxy device upon redirection from HTTP to HTTPS in the communication system according to various embodiments of the present disclosure. FIG. 13 illustrates the operation method of the proxy device 110.

Referring to FIG. 13, in step 1301, the proxy device receives a DNS query for a particular domain from the client device (for example, the terminal 120). For example, as the client device executes an application such as a web-surfing application, the proxy device may receive a DNS query message for a domain name such as aaa.com.

Thereafter, in step 1303, the proxy device transmits the DNS query response message to the client device. According to an embodiment, the proxy device may identify the DNS list and transmit a DNS query response message including an IP address corresponding to the particular domain. For example, the proxy device may identify one or more IP addresses corresponding to aaa.com in the DNS list and transmit a DNS query response message including the IP address 2.1.1.1 of the shortest RTT. For example, when the number of IP addresses corresponding to the particular domain is plural in the DNS table, the proxy device may transmit a DNS query response message including only the IP address having the shortest RTT or including some or all of the IP addresses in ascending order, starting with the shortest RTT. The DNS table may be configured as [Table 1] above.

In step 1305, the proxy device receives a message that makes a request for the connection to the corresponding IP address from the client device. For example, the proxy device may receive a connection request message for the IP address 2.1.1.1 corresponding to aaa.com from the client device. The message received from the client device may be a SYN message for synchronizing data transmission/reception timing, which is a port 80 connection request for an HTTP connection.

Thereafter, in step 1307, the proxy device makes a request for the connection to the corresponding domain through the changed port to the content server (for example, the content server 140-1). For example, the proxy device may attempt HTTPS connection to the IP address corresponding to the corresponding domain of the redirect list in response to the HTTP connection request through port 80. The message transmitted by the proxy device may be a SYN message for synchronization, and the proxy device may transmit a request for connection to port 443 for redirect to HTTPS. The redirect from HTTP to HTTPS corresponds to a protocol change of the same server IP Address from HTTP to HTTPS, unlike the redirect from aaa.com to bbb.com, and thus a DNS query process with the redirect server is not necessary.

In step 1309, the proxy device transmits a response message of the connection request to the client device. For example, the proxy device may transmit a SYN/ACK message of the SYN message of the client device.

Thereafter, in step 1311, the proxy device receives a response message of the connection request message from the client device. For example, the proxy device may receive an ACK message of the SYN/ACK message from the client device.

In step 1313, the proxy device receives a response message of the connection request message from the redirect server. For example, the proxy device may receive the SYN/ACK message of the SYN message from the redirect server.

In step 1315, the proxy device receives a message for data transmission from the client device. For example, the proxy device may receive an HTTP GET message for transmitting data through HTTP communication from the client device.

In step 1317, the proxy device transmits a response message to the redirect server. For example, the proxy device may transmit an ACK message to the redirect server in response to the SYN/ACK message received in step 1313.

In step 1319, the proxy device transmits a redirect message to the client device. For example, the proxy device may determine that the HTTP GET message received from the terminal in step 1315 matches a redirect trigger message within the redirect list. The proxy device may generate a redirect message based on the redirect message within the redirect list and transmit the generated message to the client device. The redirect message may be a 301 Redirect message. The redirect list may be configured as shown in [Table 2] above. According to an embodiment, the 301 Redirect message may include information on redirection to HTTPS for the HTTP connection requested by the client device.

In step 1321, the proxy device receives a message that makes a request for the connection to the corresponding IP address from the client device. For example, the proxy device may receive, from the client device, a message making a request for connection via HTTPS port 443 as redirected. The message received from the client device may be a SYN message for synchronizing data transmission/reception timing.

In step 1323, the proxy device transmits a response message of the connection request to the client device. For example, the proxy device may transmit a SYN/ACK message of the SYN message of the client device.

In step 1325, the proxy device receives a response message of the connection request message from the client device. For example, the proxy device may receive an ACK message of the SYN/ACK message from the client device.

Thereafter, in steps 1327 to 1337, a connection establishment process by the HTTPS protocol may be further performed. For example, the proxy device may receive a Client Hello message from the client device in step 1327 and may transmit the Client Hello message to the content server in step 1329. Thereafter, the proxy device may receive a Server Hello Cipher Spec message from the content server in step 1331 and transmit the Server Hello Cipher Spec message to the client device in step 1333. The proxy device may receive a Cipher Spec message from the client device in step 1335 and transmit the Cipher Spec message to the content server in step 1337.

In step 1339, the proxy device receives a message for data transmission from the client device. For example, the proxy device may receive an HTTPS GET message for transmitting data through HTTPS communication from the client device.

In step 1341, the proxy device transmits a message for data transmission to the content server. For example, the proxy device may transmit the HTTPS GET message for transmitting data through HTTPS communication to the content server.

In step 1343, the proxy device receives data from the content server. For example, the proxy device may receive data from the content server through HTTPS communication.

Thereafter, in step 1345, the proxy device transmits data to the client device. For example, the proxy device may transmit the data received from the content server to the client device.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating a proxy device in a communication system, the method comprising:
   receiving information on at least one domain name from an external server;
   generating connection information on the at least one domain name based on the received information;
   receiving a domain name system (DNS) query message including one of the at least one domain name from a client device;
   transmitting, to the client device, a DNS query response based on the connection information without transmitting the DNS query message to a DNS server; and
   establishing a connection to a server corresponding to the domain name included in the DNS query message based on the connection information.

2. The method of claim 1, wherein:
   the external server is configured to collect traffic information on a plurality of domain names and determine priorities thereof, and
   the at least one domain name is determined based on the priorities.

3. The method of claim 1, wherein the generating of the connection information on the at least one domain name comprises:
   transmitting a DNS query for the at least one domain name to a DNS when a preset time passes;
   receiving a DNS query response for the at least one domain name from the DNS; and
   updating a DNS table including the connection information on the at least one domain name based on the received DNS query response.

4. The method of claim 3, wherein the DNS table comprises at least one of a time at which a last DNS query is generated for the at least one domain name, a last update time, a Canonical NAME (CNAME) for the at least one domain name, an Internet Protocol (IP) address corresponding to the CNAME, a Round-Trip Time (RTT) between a server corresponding to the IP address and the proxy device, or last RTT update time information.

5. The method of claim 1, further comprising:
   determining at least one IP address corresponding to the domain name in the connection information on the at least one domain name,
   wherein transmitting the DNS query response comprises transmitting a DNS query response message for the domain name to the client device based on the at least one IP address, and
   wherein the DNS query response message includes an IP address having a shortest RTT among the at least one IP address corresponding to the domain name.

6. The method of claim 1, wherein the generating of the connection information on the at least one domain name comprises:
   transmitting a connection establishment request message to an IP address of a server corresponding to the at least one domain name;

receiving at least one piece of redirect server information corresponding to the at least one domain name in response to the connection establishment request message; and updating a redirect list including the at least one piece of redirect server information.

7. The method of claim 6, wherein the redirect list comprises at least one of an IP address of at least one redirect server, a redirect trigger message, or redirect message information received from the server corresponding to the at least one domain name.

8. The method of claim 6, further comprising, if a redirect trigger message is received from the client device, transmitting redirect domain information corresponding to the domain name.

9. The method of claim 6, further comprising, if a redirect trigger message is received from the client device, transmitting the at least one piece of redirect server information corresponding to the domain name.

10. The method of claim 6, further comprising, if a redirect trigger message for Hyper Text Transfer Protocol (HTTP) communication is received from the client device, transmitting information for redirecting to Hyper Text Transfer Protocol over Secure Socket Layer (HTTPS).

11. A proxy device in a communication system, the proxy device comprising:

a transceiver; and at least one processor coupled to the transceiver and configured to:

receive information on at least one domain name from an external server, generate connection information on the at least one domain name based on the received information, receive a domain name system (DNS) query message including one of the at least one domain name from a client device, transmit, to the client device, a DNS query response based on the connection information without transmitting the DNS query message to a DNS server, and establish a connection to a server corresponding to the domain name included in the DNS query message based on the connection information.

12. The proxy device of claim 11, wherein:

the external server is configured to collect traffic information on a plurality of domain names and determine priorities thereof, and the at least one domain name is determined based on the priorities.

13. The proxy device of claim 11, wherein the at least one processor is further configured to:

transmit a DNS query for the at least one domain name to a DNS when a preset time passes, receive a DNS query response for the at least one domain name from the DNS, and update a DNS table including the connection information on the at least one domain name based on the received DNS query response.

14. The proxy device of claim 13, wherein the DNS table comprises at least one of a time at which a last DNS query is generated for the at least one domain name, a last update time, a Canonical NAME (CNAME) for the at least one domain name, an Internet Protocol (IP) address corresponding to the CNAME, a Round-Trip Time (RTT) between a server corresponding to the IP address and the proxy device, or last RTT update time information.

15. The proxy device of claim 11, wherein:

the at least one processor is further configured to:

determine at least one IP address corresponding to the domain name in the connection information on the at least one domain name; and transmit the DNS query response by transmitting a DNS query response message for the domain name to the client device based on the at least one IP address, and wherein the DNS query response message includes an IP address having a shortest RTT among the at least one IP address corresponding to the domain name.

16. The proxy device of claim 11, wherein the at least one processor is further configured to:

transmit a connection establishment request message to an IP address of a server corresponding to the at least one domain name, receive at least one piece of redirect server information corresponding to the at least one domain name in response to the connection establishment request message, and update a redirect list including the at least one piece of redirect server information.

17. The proxy device of claim 16, wherein the redirect list comprises at least one of an IP address of at least one redirect server, a redirect trigger message, or redirect message information received from the server corresponding to the at least one domain name.

18. The proxy device of claim 16, wherein the at least one processor is further configured to transmit redirect domain information corresponding to the domain name when a redirect trigger message is received from the client device.

19. The proxy device of claim 16, wherein the at least one processor is configured to transmit the at least one piece of redirect server information corresponding to the domain name when a redirect trigger message is received from the client device.

20. The proxy device of claim 16, wherein the at least one processor is further configured to transmit information for redirecting to Hyper Text Transfer Protocol over Secure Socket Layer (HTTPS) when a redirect trigger message for Hyper Text Transfer Protocol (HTTP) communication is received from the client device.

* * * * *